United States Patent

Plate et al.

[11] 4,073,200
[45] Feb. 14, 1978

[54] CABLE RETAINER

[75] Inventors: John R. Plate; James H. Lucas, both of Milwaukee, Wis.

[73] Assignee: Allis-Chalmers Corporation, Milwaukee, Wis.

[21] Appl. No.: 712,719

[22] Filed: Aug. 9, 1976

[51] Int. Cl.² ............................................... F16C 1/10
[52] U.S. Cl. ................................ 74/501 R; 24/73 C; 248/74 A
[58] Field of Search ............ 74/501 R, 501 M, 501 P, 74/501.5 R, 501.5 H, 502; 248/49, 58, 62, 63, 67.7, 73, 74 R, 74 A; 24/73 C, 73 SA, 261 AC

[56] References Cited

U.S. PATENT DOCUMENTS

| 2,062,283 | 12/1936 | Austin | 248/63 |
| 2,234,656 | 3/1941 | Schmalz | 24/73 C |
| 2,253,304 | 8/1941 | McGall | 74/502 X |
| 2,843,230 | 7/1958 | Nelsson | 24/73 C |
| 2,892,234 | 6/1959 | Klein | 248/74 R X |
| 2,985,268 | 5/1961 | Morse | 74/501 R X |
| 3,154,278 | 10/1964 | Becker | 248/73 |
| 3,182,938 | 5/1965 | Gibbon | 248/63 |
| 3,472,378 | 10/1969 | Payne | 74/501 R X |
| 3,918,527 | 11/1975 | Wagner | 172/9 |

FOREIGN PATENT DOCUMENTS

| 479,234 | 12/1951 | Canada | 248/67.7 |
| 357,893 | 1/1906 | France | 74/501 R |

Primary Examiner—Roy D. Frazier
Assistant Examiner—Rodney H. Bonck
Attorney, Agent, or Firm—Arthur L. Nelson

[57] ABSTRACT

A cable retainer for locking the sheath of a sheathed cable in a pivotal position on a support.

10 Claims, 9 Drawing Figures

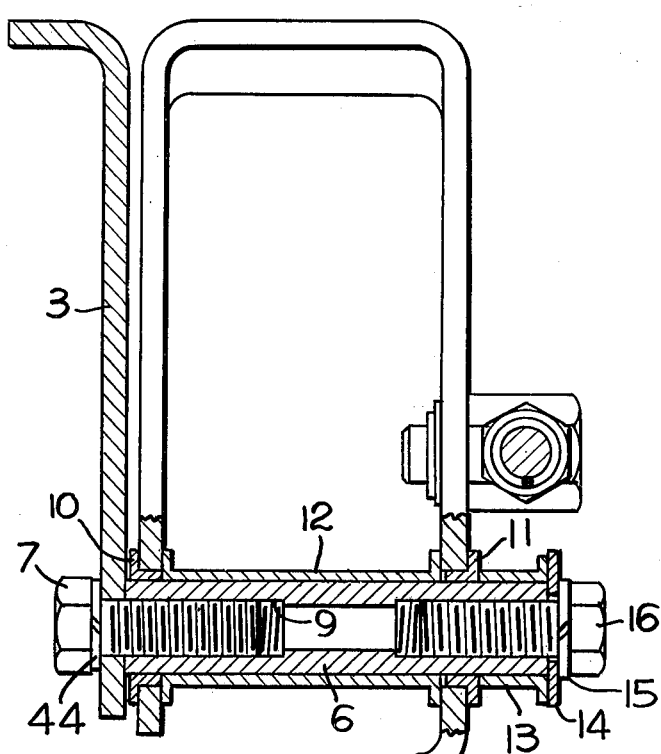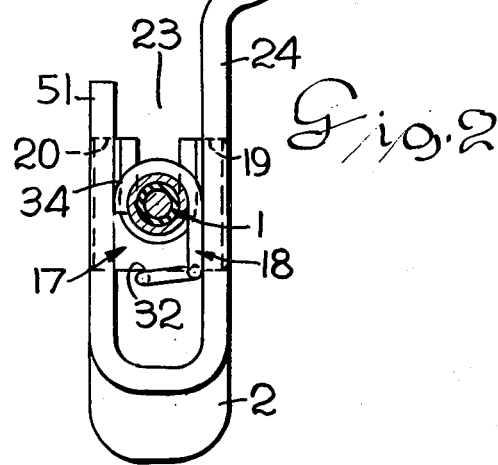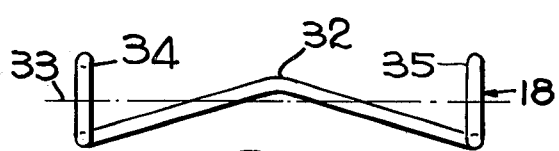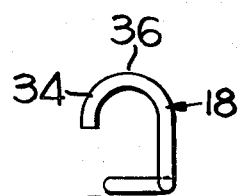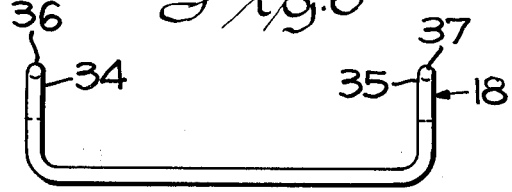

CABLE RETAINER

This invention relates to a cable retainer and more particularly to a cable retainer including a trunnion and clip which pivotally hold a cable on a lever.

Sheathed cables or bowden wires are often used to transmit a force for actuating a remotely contolled actuator. The sheath is anchored on one end while the cable can move to provide relative movement of the cable relative to the sheath. The opposite end of the sheath is also anchored so that there is relative motion between the cable and the sheath as the cable slides in and out of the sheath. In this manner the cable per se can transmit a force to a remote location. Various means of attaching the sheath to a stationary element have been used in the past, however, this invention provides a pivotal connection which is readily connected or removed.

Accordingly, this invention provides for use of a sheathed cable to transmit a force to a lever. The cable is fastened to a lever which is pivotally mounted on a stationary support. The sheath is anchored at its remote end on a trunnion which is pivotally supported on another lever. The cable fits in a transverse slot of the trunnion while a clip extending beneath the trunnion has upwardly extending tabs on either end which extend around the cable to hold the cable sheath on the remote end of the cable pivotally supported on the lever. A cable retainer of this type adapts itself well for use in a cable controlled linkage as illustrated in a U.S. Pat. No. 3,918,527, Robert J. Wagner, entitled Cable Controlled Draft Load and Position Sensing Linkage.

Accordingly, it is an object of this invention to provide a clip and trunnion for pivotally mounting a cable on a lever.

It is another object of this invention to provide a trunnion supported cable fastened by a clip for pivotally connecting a cable to a support.

It is a further object of this invention to provide a trunnion and clip for pivotally supporting the sheath of a sheathed cable on a lever of a feedback sensing mechanism of a position and draft control linkage for a hydraulic weight distribution system. The position and draft load control are connected through the cable with feedback compensation applied through the cable sheath.

The objects of this invention are accomplished by providing a lever having two support members defining a central opening. The opening receives a trunnion having a transverse slot aligned with the opening between the support members for receiving a cable in the slot of the trunnion. A clip having a tab on either end extends underneath a trunnion and extends up over the cable on either side of the trunnion to lock the cable on the trunnion with an annular recess on an armored portion of the cable preventing the cable from moving axially. This arrangement provides a pivotal support for the cable sheath on a lever.

Referring to the drawings, the preferred embodiment of this invention is illustrated.

FIG. 2 illustrates a cross section view of the cable carrying lever with the trunnion and clip holding the cable in position.

FIG. 6 illustrates a top view of the clip.

FIG. 7 illustrates a side elevation view of the clip.

FIG. 8 illustrates an end view of the clip.

FIG. 9 illustrates a side elevation view of the end of the cable.

Figure 1:
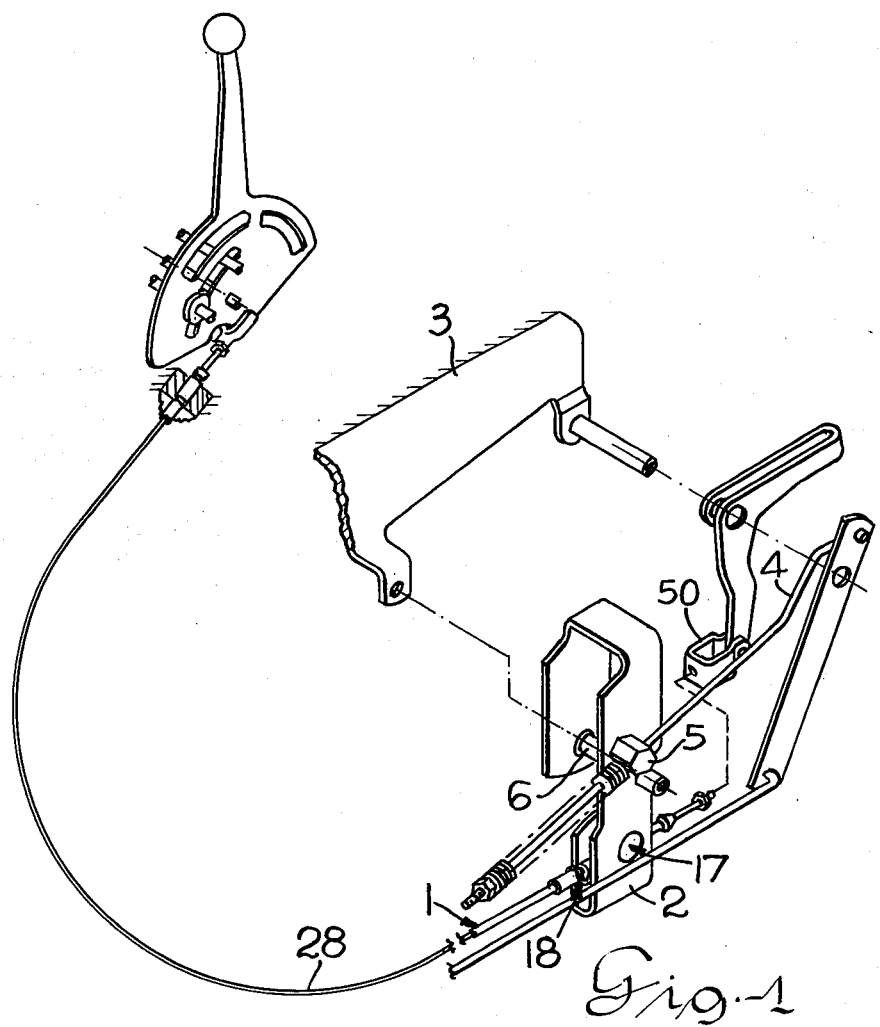
FIG. 1 illustrates a three dimensional view of the lever and its pivotal support with a force transmitting means for operating the lever carrying the sheathed cable.

Referring to the drawings, FIGS. 1 and 2 illustrate the three dimensional view and a cross section view of the sheathed cable 1 of which the cable 28 is pivotally connected to the lever 2 which is pivotally supported on the bracket 3. The link 4 connected to the stem 5 transmits a force to the lever 2. The sheath 27 of sheathed cable is connected to lever 2, cable 28 is connected to clevis 50. The lever 2 is pivotally mounted on the shaft 6 which is pivotally supported on the bracket 3. The shaft 6 is a quill shaft in which the bolt 7 fastens the quill shaft to the bracket 3. The washer 44 is positioned between the bolt and the bracket 3 while the bolt threadedly engages the inner periphery 9 of the quill shaft 6.

The bushings 10 and 11 embrace the quill shaft 6 and rotatably support the lever 2. The spacer 12 embracing the quill shaft 6 axially aligns the lever 2 on the quill shaft 6. This position is maintained by the spacer 13, washers 14 and 15 and bolt 16 which threadedly engages the inner periphery of the quill shaft 6. The cable 1 is mounted in a trunnion 17 which is held in place by the clip 18. The trunnion is received in the openings 19 and 20 of the lower portion of the lever 2.

Figure 3:
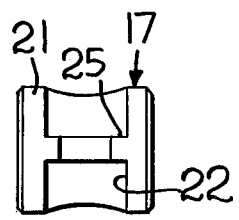
FIG. 3 illustrates a top view of the trunnion.
Figure 4:
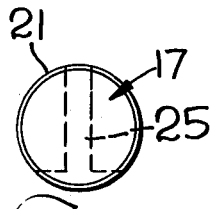
FIG. 4 illustrates an end view of the trunnion.
Figure 5:
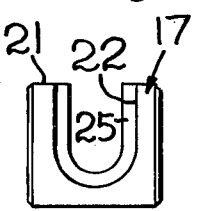
FIG. 5 illustrates a side elevation view of the trunnion.

The trunnion 17 is shown in FIGS. 3, 4 and 5. The openings 19 and 20 in the lever 2 are cylindrical and engage cylindrical surface 21 of the trunnion 17 in its operating position. The transverse slot 22 is aligned with the space 23 between the support members 24 and 51 of the lever 2. The slot 22 extends upwardly and forms the ridge 25 extending around the inner periphery of the slot 22. The cable 1 is formed with a sheath 27 through which the cable 28 extends. The sheath 27 is also covered on its end with a metallic armor 40. The armor 40 forms cylindrical surfaces 29 and 30 and an annular recess 31 between these two surfaces. The annular recess 31 receives the ridge 25 of the trunnion 17 when the cable is positioned in the slot 22.

The clip 18 is shown in FIGS. 6, 7 and 8. The intermediate portion of the clip 18 is bent slightly across the centerline 33 to form a pressure point 32 near the centerline 33. The pressure point engages the underside of the trunnion near the center in the operating position.

The two ends of the clip 18 form tabs 34 and 35. Each tab forms a hook defining arcuate portions 36 and 37 which have a radius of curvature essentially equal to the radius of curvature of the cable armor on the sheath. When the clip is positioned on the cable as shown in FIG. 2, each of the tabs 34 and 35 extends upwardly and over the cable. The pressure point 32 produces an upward force on the underside of the trunnion equal to the two opposing forces on the arcuate portions of the clip. The forces are essentially through the centerline 33 which passes through the centers of curvatures of the tabs 36 and 37 as shown by the clip tabs which is also essentially coincidental with the centerline of the cable when assembled.

The operation of the device will be described in the following paragraphs.

A lever 2 defines cylindrical openings 19 and 20 which are aligned axially in the support members 24 and 51. The trunnion, which has a cylindrical surface the size of the openings 19 and 20, extends through the openings. The cable then is extended into the space 23 between the support members 24 and 25 and positioned with the ridge 25 in the annular recess 31 of the armor 40 on the sheathed cable 1. The clip 18 is positioned underneath the trunnion 17 and each of the tabs are then resiliently sprung over the cable to engage the armor as shown in FIG. 2. In this position, the cable is locked against movement axially relative to the lever 2 and also retained in this position from coming out of the slot 22 due to the resilience of the clip causing downwardly directed forces from the tabs 34 and 35 through the centerline of the cable. This maintains the cable in a pivotally connected position on the lever 2. Any force from the link 4 is transmitted through the lever 2 and axially through the cable sheath and cable as the lever 2 is pivoted. The bracket 3 remains stationary while the lever 2 pivots in reponse to a force from the link 4.

The embodiments of the invention in which an exclusive property or privilege is claimed are defined as follows:

1. A mechanism including a cable retainer comprising, a mounting means, a lever pivotally mounted on said mounting means, a cable support on said lever, a cable, means defining support members in spaced relation on said cable support forming a cable opening, means in said support members defining axially aligned holes, a trunnion received for pivotal movement in said holes, said trunnion defining a transverse slot for alignment with the cable opening between said support members and receiving said cable whereby said cable holds said trunnion on said cable support, a resilient clip including a portion extending under said trunnion and tabs extending over said cable for locking said cable on said trunnion and preventing axial movement of said cable relative to said trunnion.

2. A mechanism including a cable retainer as set forth in claim 1 wherein said cable support defines a bifurcated lever.

3. A mechanism including a cable retainer as set forth in claim 1 including a wire defining said clip.

4. A mechanism including a cable retainer as set forth in claim 1 wherein said trunnion defines a cylindrical periphery, and said support members defining holes define cylindrical holes for receiving said trunnion.

5. A mechanism including a cable retainer as set forth in claim 1 wherein said clip defines an intermediate portion for extending under the center portion of said trunnion and producing a force essentially through the centerline of said cable, said tabs on said clip define arcuate portions producing counterforces essentially through the center of said cable to retain said cable on said trunnion.

6. A mechanism including a cable retainer as set forth in claim 1 including a transversely extending intermediate portion of said clip extending transversely under the trunnion to a point essentially under the centerline of said cable, said tabs defining arcuate portions for engaging said cable and pressing downward to counteract the force on the intermediate portion of said clip on said trunnion.

7. A mechanism including a cable retainer as set forth in claim 1 wherein said cable defines an armor encasing a sheath defining a peripheral recess, a ridge formed in said transverse slot of said trunnion received in said recess for locking said cable from moving axially relative to said trunnion in the operating position.

8. A mechanism including a cable retainer as set forth in claim 1 wherein said cable defines an annular recess for receiving a portion of said trunnion and locking said cable against axial movement relative to said trunnion.

9. A mechanism including a cable retainer as set forth in claim 1 wherein said clip defines a spring fo retaining said cable on said trunnion.

10. A mechanism including a cable retainer as set forth in claim 1 wherein said cable defines an annular recess, said trunnion defining said slot including means defining an arcuate base of said slot, said trunnion defining a ridge in said slot for reception in said recess of said cable, said clip defining a center portion producing an upward force through the center of said cable, said tabs producing counterforces downwardly through the center of said cable for locking said cable on said trunnion.

* * * * *